United States Patent
Hasegawa (10) Patent No.: US 12,110,964 B2
(45) Date of Patent: Oct. 8, 2024

(54) SHIFT LOCK MECHANISM OF VEHICLE

(71) Applicant: SUBARU CORPORATION, Tokyo (JP)

(72) Inventor: Dai Hasegawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/100,617

(22) Filed: Jan. 24, 2023

(65) Prior Publication Data

US 2023/0243418 A1 Aug. 3, 2023

(30) Foreign Application Priority Data

Feb. 2, 2022 (JP) ................................. 2022-014911

(51) Int. Cl.
*F16H 59/02* (2006.01)
*F16H 59/44* (2006.01)
*F16H 59/54* (2006.01)
*F16H 61/22* (2006.01)

(52) U.S. Cl.
CPC ......... *F16H 61/22* (2013.01); *F16H 59/0278* (2013.01); *F16H 59/44* (2013.01); *F16H 59/54* (2013.01); *F16H 2059/0282* (2013.01); *F16H 2059/446* (2013.01); *F16H 2061/223* (2013.01)

(58) Field of Classification Search
CPC ...... F16H 59/44; F16H 59/54; F16H 59/0278; F16H 61/22; F16H 2059/0282; F16H 2059/446; F16H 2061/223

USPC .......................................................... 74/491
See application file for complete search history.

(56) References Cited

U.S. PATENT DOCUMENTS

| 2015/0362067 | A1* | 12/2015 | Mitteer | F16H 59/0278 74/490.07 |
| 2016/0245395 | A1* | 8/2016 | Hong | F16H 59/044 |
| 2017/0159799 | A1* | 6/2017 | Fribus | F16H 61/24 |
| 2018/0245683 | A1* | 8/2018 | Kim | F16H 59/0278 |

FOREIGN PATENT DOCUMENTS

| DE | 102007019468 A1 * | 11/2008 | ............. F16H 59/10 |
| JP | 2000-272369 A | 10/2000 | |
| JP | 2008-2561 A | 1/2008 | |

* cited by examiner

*Primary Examiner* — T. Scott Fix
(74) *Attorney, Agent, or Firm* — TROUTMAN PEPPER HAMILTON SANDERS LLP (57) ABSTRACT

A shift lock mechanism for a vehicle includes: a member to be locked that is provided to a selector lever for selecting a transmission gear of an automatic transmission, an engaging part provided to the member to be locked at a position corresponding to the transmission gear, a lock member facing the member to be locked and engageable with the engaging part, a slope part disposed at an end of the lock member, a driving device that drives the lock member to lock the selector lever or enable the selector lever to move, a buffer member that is provided to the driving device and compressed to urge the lock member toward the member to be locked which is retracted, and a control device that receives a depression signal from a brake pedal and a vehicle speed signal from a vehicle speed sensor and to control to drive the driving device.

4 Claims, 13 Drawing Sheets

SHIFT LOCK MECHANISM OF VEHICLE

CROSS-REFERENCE TO RELATED APPLICATION

The present application claims priority from Japanese Patent Application No. 2022-014911 filed on Feb. 2, 2022, the entire contents of which are hereby incorporated by reference.

BACKGROUND

The disclosure relates to a shift lock mechanism of a vehicle for locking a range position of a selector lever, which is used to shift gears of an automatic transmission.

Vehicles such as automobiles are provided with a selector lever (also called a "shift lever") for changing gears of a transmission. Automatic vehicles are provided with an automatic transmission that automatically performs clutch operation and gear selection. This automatic transmission is a transmission that changes gears to vary output of an engine in accordance with a travelling state.

Existing automatic vehicles are driven by operating to selectively move a selector lever to a position of a range pattern, such as a parking P range, a reverse R range, a neutral N range, or a drive D range.

Various devices have been proposed in relation to a selector lever of such an existing automatic vehicle. In one example, Japanese Unexamined Patent Application Publication No. 2000-272369 discloses a shift lever device that does not cause hitting sound of a solenoid at the time a brake is stepped on while a selector lever is at a P range position. In another example, Japanese Unexamined Patent Application Publication No. 2008-002561 discloses a range switching control device that completes switching of actual range positions in a short time in response to input operation.

SUMMARY

An aspect of the disclosure provides a shift lock mechanism for a vehicle. The shift lock mechanism includes a selector lever, a member to be locked, an engaging part, a lock member, a slope part, a driving device, a buffer member, and a control device. The selector lever is for selecting a transmission gear of an automatic transmission of the vehicle. The member to be locked is provided to the selector lever. The engaging part is provided to the member to be locked at a position corresponding to the transmission gear selected by using the selector lever. The lock member is disposed so as to face the member to be locked and is engageable with the engaging part. The slope part is disposed at an end of the lock member and is configured to prevent the lock member from being caught when the lock member is being engaged or disengaged. The driving device is configured to drive the lock member so that the lock member is engaged with the engaging part to lock the selector lever and is configured to drive the lock member so that the lock member is disengaged and retracted from the engaging part to enable the selector lever to move. The buffer member is provided to the driving device and is configured to be compressed to urge the lock member toward the member to be locked while the lock member is retracted. The control device is configured to receive a depression signal from a brake pedal of the vehicle and a vehicle speed signal from a vehicle speed sensor of the vehicle and to control to drive the driving device.

An aspect of the disclosure provides a shift lock mechanism for a vehicle. The shift lock mechanism includes a selector lever, a member to be locked, an engaging part, a lock member, a slope part, a driving device, a buffer member, and circuitry. The selector lever is for selecting a transmission gear of an automatic transmission of the vehicle. The member to be locked is provided to the selector lever. The engaging part is provided to the member to be locked at a position corresponding to the transmission gear selected by using the selector lever. The lock member is disposed so as to face the member to be locked and is engageable with the engaging part. The slope part is formed at an end of the lock member and is configured to prevent the lock member from being caught when the lock member is being engaged or disengaged. The driving device includes a solenoid and is configured to drive the lock member so that the lock member is engaged with the engaging part to lock the selector lever and is configured to drive the lock member so that the lock member is disengaged and retracted from the engaging part to enable the selector lever to move. The buffer member is provided to the driving device and is configured to be compressed to urge the lock member toward the member to be locked while the lock member is retracted. The circuitry is configured to receive a depression signal from a brake pedal of the vehicle and a vehicle speed signal from a vehicle speed sensor of the vehicle and to control to drive the solenoid of the driving device.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

A shift lock mechanism of a selector lever has a trade-off relationship between prevention of a movable lock member from being caught and absorption of structural variations, and it is difficult to achieve both of them at the same time. Moreover, a shift lock mechanism of a selector lever has a trade-off relationship between improvement in movement speed of a lock member and reduction in movement sound of a driving device, and it is also difficult to achieve both of them at the same time.

It is desirable to provide a shift lock mechanism of a vehicle that achieves both prevention of a lock member from being caught and absorption of structural variations, as well as both improvement in movement speed of the lock member and absorption of structural variations.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, quantities of the components and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
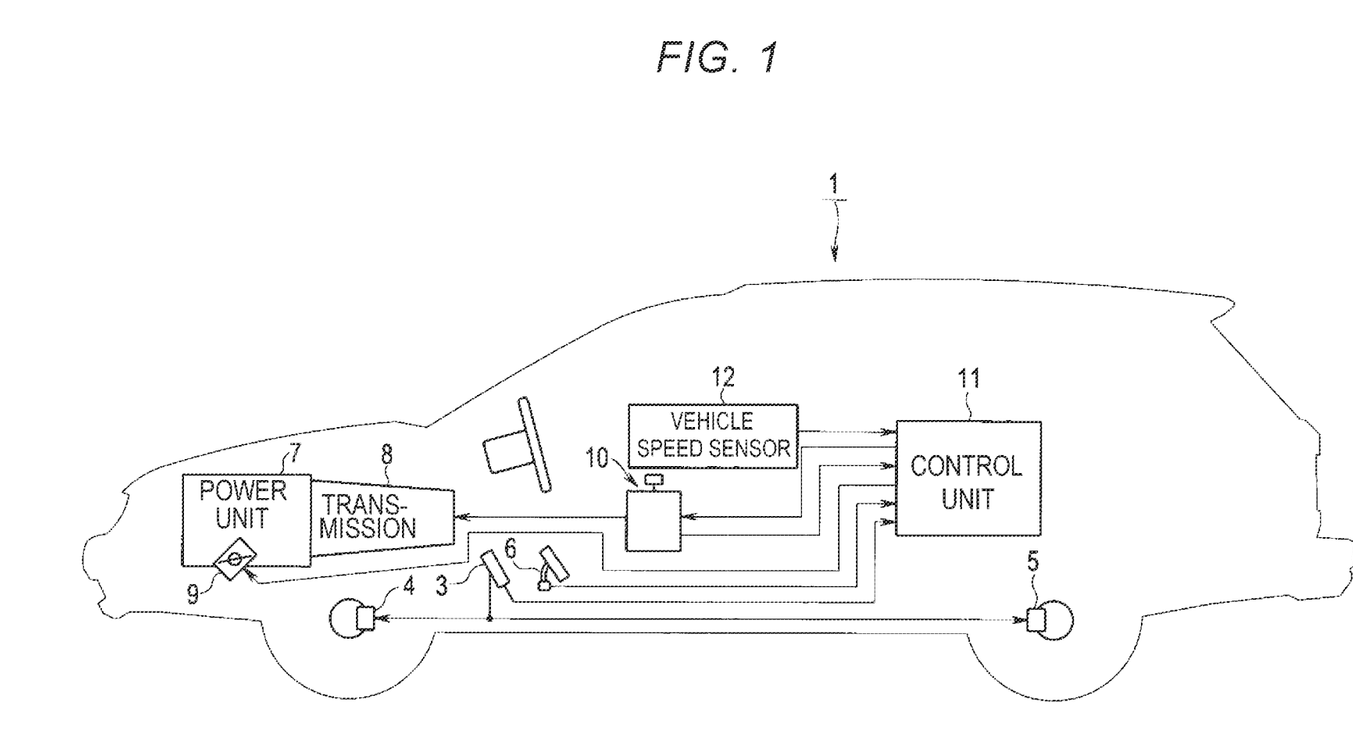
FIG. 1 is a schematic configuration diagram illustrating a configuration of a vehicle.

In FIG. 1, a reference sign 1 denotes a vehicle such as an automobile. The vehicle 1 is provided with front and rear brake mechanisms 4 and 5 that add braking forces to front and rear wheels in response to a driver stepping on a brake pedal 3, which is provided with a foot brake switch. The vehicle 1 is also provided with an accelerator pedal 6 that is coupled to an accelerator opening degree sensor for measuring a pedal depression amount that a driver depresses the pedal (accelerator opening degree).

The brake pedal 3 and the accelerator pedal 6 are electrically coupled to a control unit 11 of a control device that is a main ECU. Depression signals of the brake pedal 3 and the accelerator pedal 6 are output to the control unit 11.

The control unit 11 executes open and close control of a throttle valve 9 (output control of an engine) in accordance with the pedal depression amount (accelerator opening degree) of the accelerator pedal 6.

A power unit 7 is mounted as an engine, on a font side of the vehicle 1. A transmission 8 for varying power is provided behind the power unit 7.

The transmission 8 herein is what is called an "automatic transmission" as an automatic transmission that automatically changes a transmission gear ratio in accordance with an engine speed of the power unit 7.

The vehicle 1 includes a vehicle speed sensor 12 that is provided to a crankshaft of the power unit 7, an output shaft of the transmission 8, or the like. The vehicle speed sensor 12 is coupled to the control unit 11. The vehicle 1 may include a wheel speed sensor for the purpose of measuring vehicle speed.

A selector lever unit 10 is provided on a vehicle cabin floor of the vehicle 1. The selector lever unit 10 is what is called a "straight shifter unit".

The selector lever unit 10 transmits and receives a signal to and from the control unit 11. The selector lever unit 10 is an operation mechanism for changing transmission gears by selectively changing a hydraulic control circuit of the transmission 8 in accordance with each position such as of a parking range (P), a reverse range (R), a neutral range (N), and a drive range (D).

Figure 2:
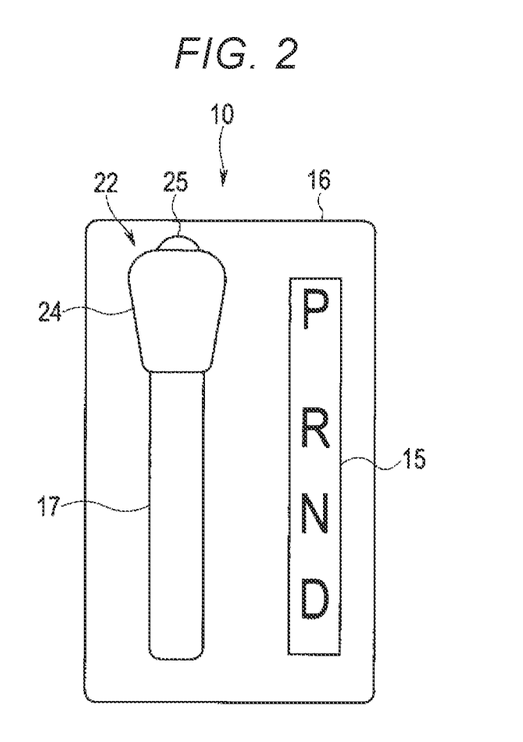
FIG. 2 is a top view illustrating a schematic configuration of a selector lever unit.

The selector lever unit 10 has a shift gate panel 16 that is provided with a range indicator 15, as illustrated in FIG. 2. The shift gate panel 16 has a gate 17 that is open as a long-hole-shaped groove.

Figure 3:
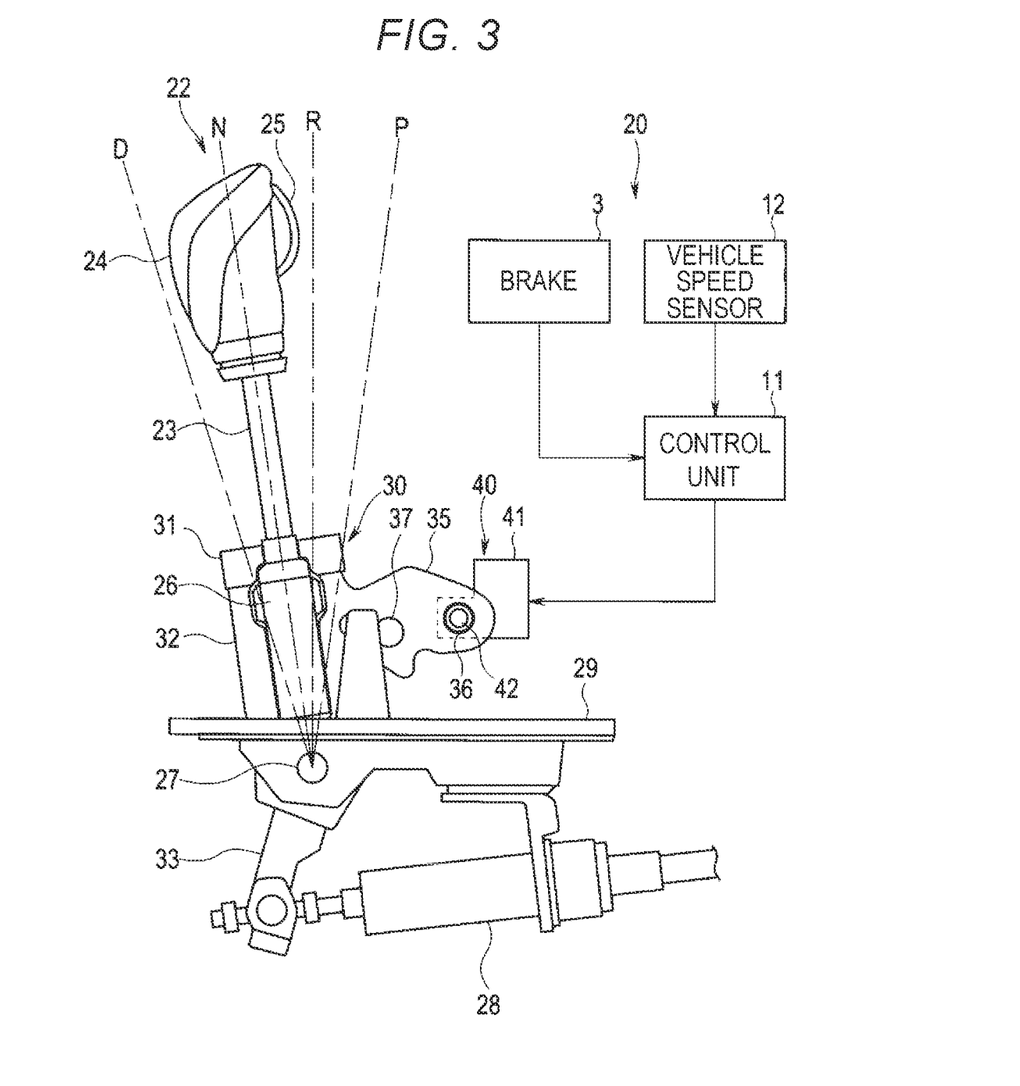
FIG. 3 is a side view illustrating a schematic configuration of a part of the selector lever unit.

A selector lever 22 is provided so as to extend upward from the gate 17 of the shift gate panel 16. The selector lever 22 includes a lever pipe 23, as illustrated in FIG. 3. A shift knob 24 is provided as an operation grip, at the top of the lever pipe 23. The shift knob 24 is provided with a push button 25.

Upon being pushed into the shift knob 24, the push button 25 makes an end of a guide rod (not illustrated) protrude into or be retracted from the lever pipe 23. The shift knob 24 is disposed above so as to protrude from the shift gate panel 16.

The selector lever unit 10 is provided with a detent mechanism (not illustrated) that keeps the selector lever 22 at each position of P, R, N, and D at which the P range, the R range, the N range, and the D range of the transmission 8 are respectively selected by the selector lever 22.

Herein, the push button 25 is provided at a front part of the shift knob 24. The push button 25 is pushed in shifting the selector lever 22 to the P range position or the R range position of the range indicator 15.

In response to this operation, the guide rod (not illustrated), which protrudes from the lever pipe 23, is moved within the lever pipe 23. At this time, the guide rod is retracted at a part protruding from the lever pipe 23, by a predetermined length.

After the end of the guide rod is retracted, retention of a detent plate (not illustrated) of the detent mechanism is released. Thus, the selector lever 22 can be shifted to the P range position or the R range position. It should be noted that the structure of the detent mechanism is publicly known, and therefore, detailed description thereof is omitted.

Figure 4:
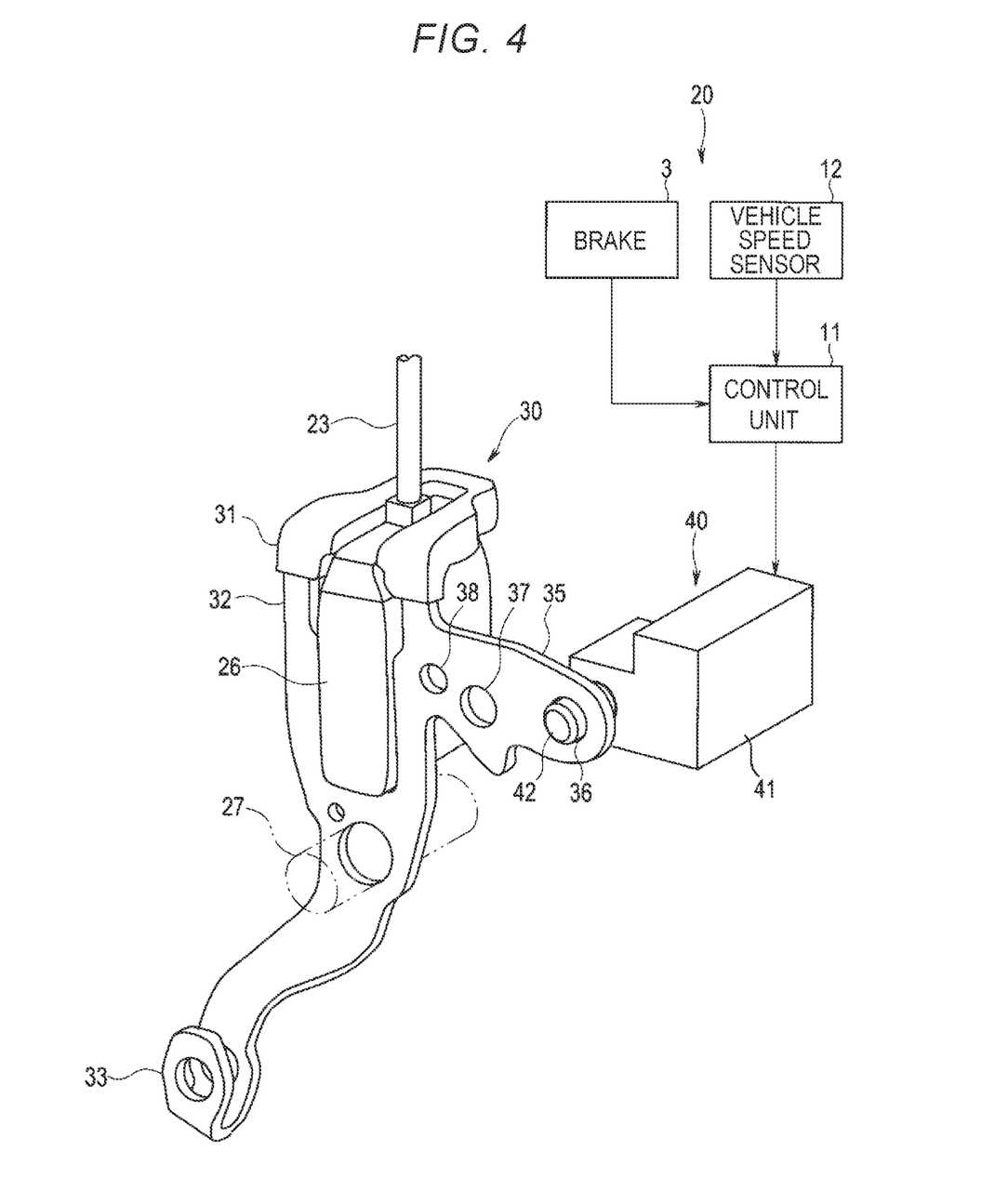
FIG. 4 is a perspective view illustrating a schematic configuration of a part of the selector lever unit.

The lever pipe 23 is coupled to a block frame body 26 at a lower end, as illustrated in FIGS. 3 and 4. The frame body 26 is coupled to an arm unit 30 that extends downward. The arm unit 30 is axially supported around a rotation shaft 27 that is turnably provided to a base plate 29.

The arm unit 30 has an approximately U-shaped block arm 31 at an upper part. The arm unit 30 also has a support arm 32 that extends downward from the block arm 31.

The support arm 32 is a metal plate member, such as of stainless steel, and the support arm 32 is hollowed and opened at a center part in the middle thereof from an upper part coupled to the block arm 31. The frame body 26, to which the lever pipe 23 is coupled, is engaged with the block arm 31 and the support arm 32, at the hollowed and opened part of the arm unit 30.

The support arm 32 has a cable mounting arm 33 that extends downward. The cable mounting arm 33 is coupled to a select cable unit 28. A lower end part of the select cable unit 28 is held by the base plate 29. The select cable unit 28 has a select cable (not illustrated) that is coupled to the transmission 8.

The support arm 32 has a lock arm 35 that is a plate-shaped and extends toward a front of the vehicle 1. The lock arm 35 is a metal plate member, such as of stainless steel, and is formed into one body together with the support arm 32. In one embodiment, the lock arm 35 may serve as a "member to be locked".

Herein, the lock arm 35 has three engaging parts of lock holes 36, 37, and 38 that penetrate at positions corresponding to the N range position, the R range position, and the P range position.

A lock member is inserted into and engaged with one of the three lock holes 36, 37, and 38, whereby the selector lever 22 is locked at the corresponding one of the N range position, the R range position, and the P range position.

The vehicle 1 has a shift lock mechanism 20 that includes the support arm 32 having the lock arm 35, a lock unit 40, and the control unit 11 that receives a depression signal from the foot brake switch of the brake pedal 3 and a vehicle speed signal, such as a pulse signal, from the vehicle speed sensor 12.

Figure 5:
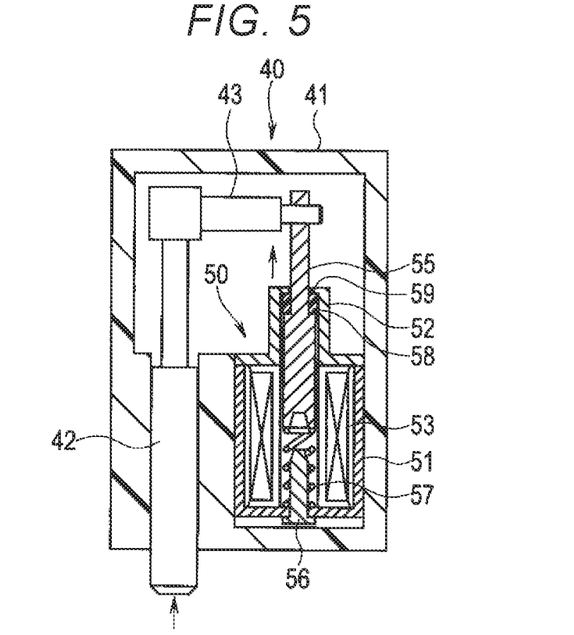
FIG. 5 is a sectional view illustrating a structure of a lock unit in a state of being driven under control of a control unit, whereby a fixing rod is retracted.
Figure 6:
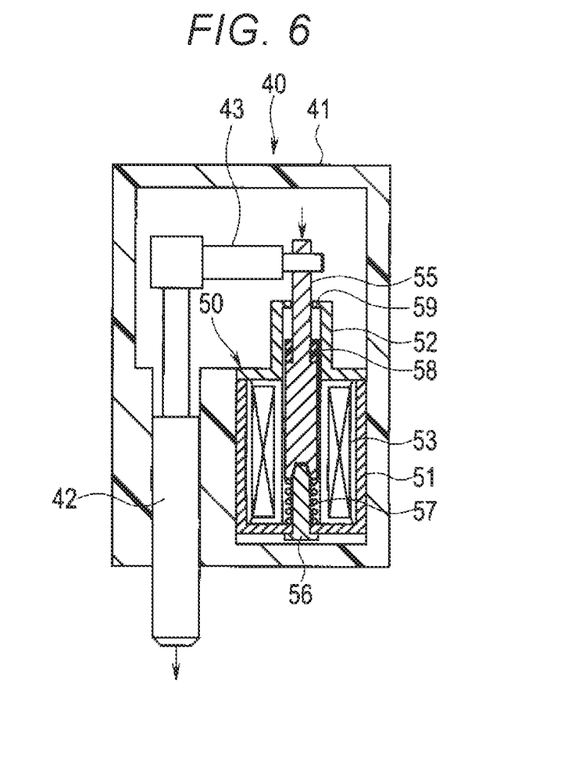
FIG. 6 is a sectional view illustrating the structure of the lock unit in a state of being driven under control of the control unit, whereby the fixing rod is protruded.

The lock unit 40 of the shift lock mechanism 20 includes a solenoid 50 that is provided inside an exterior member 41 being a frame member, as illustrated in FIGS. 5 and 6. The solenoid 50 is composed mainly of a frame 51, a cover frame 52, an excitation coil 53, a movable iron core (plunger) 55, a fixed iron core (stopper) 56 as a plunger receiver, and a coil spring 57 as a return spring.

The solenoid 50 is a pull solenoid in which the plunger 55 is pulled to the inside of the frame 51 by energizing the excitation coil 53. While the excitation coil 53 is not energized, the plunger 55 is pushed (pressed) by the coil spring 57, which is provided so as to cover the stopper 56, and it moves in a direction of protruding from the cover frame 52.

The plunger 55 is disposed with a tubular sound-absorbing rubber 58 that is a buffer member (cushion rubber) formed of silicone rubber. The sound-absorbing rubber 58 is fixed in such a manner as to cover an outer circumference of the plunger 55 while its end is in contact with a step formed at a middle part of the plunger 55.

In the state in which the plunger 55 is protruded, the sound-absorbing rubber 58 is abutted between the step of the plunger 55 and an inward flange 59, which is formed at an end of the cover frame 52, and it is thereby compressed. Thus, the sound-absorbing rubber 58 urges the plunger 55 to the inside of the exterior member 41, against an elastic force of the coil spring 57.

That is, the sound-absorbing rubber 58 in a compressed state urges the plunger 55 in a direction of pulling it into the frame 51, against the elastic force of the coil spring 57. The urging force of the sound-absorbing rubber 58 is set so that a predetermined repulsive force smaller than the elastic force of the coil spring 57 is generated.

An end in the protruding direction of the plunger 55 is coupled to an end of a coupling rod 43, which is formed of a hard member, such as a metal member. The coupling rod 43 is coupled to the plunger 55 in a direction orthogonal to a longitudinal axis of the plunger 55 by press fitting or screwing.

The other end of the coupling rod 43 is coupled to a fixing rod 42 that is a shift lock member of a metal rod body. The fixing rod 42 is provided so that an end faces a flat surface 35a of the lock arm 35. The fixing rod 42 is straightly guided in parallel to the longitudinal axis of the plunger 55, inside the exterior member 41.

That is, the fixing rod 42 advances and retracts in parallel to the movement direction of the plunger 55. The fixing rod 42 advances and retracts along with the plunger 55 of the solenoid 50 and thereby protrudes from and retracts into at one surface of the exterior member 41.

In the lock unit 40 thus configured, the solenoid 50 is driven under control of the control unit 11. The lock unit 40 is fixed to the base plate 29.

The following describes an example of a structure for locking the selector lever 22 at the N range position so as not to move to the D range position or the R range position, by the shift lock mechanism 20 of the vehicle 1, which is thus configured.

Additionally, another similar shift lock mechanism 20 may also be provided in order to lock the selector lever 22 at the R range position or the P range position so as not to move to other range position. Alternatively, for the structure for locking the selector lever 22 at the R range position or the P range position, a publicly known shift lock mechanism may be provided.

Figure 7:
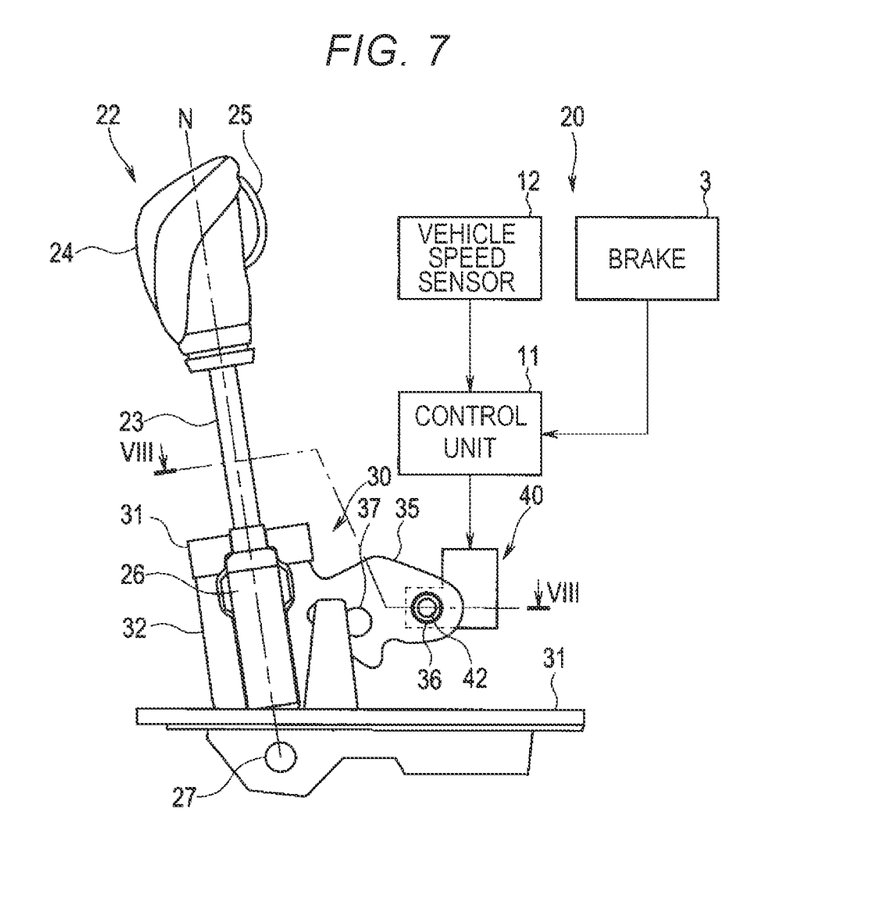
FIG. 7 is a side view illustrating a schematic configuration of a part of the selector lever unit in a neutral range.
Figure 8:
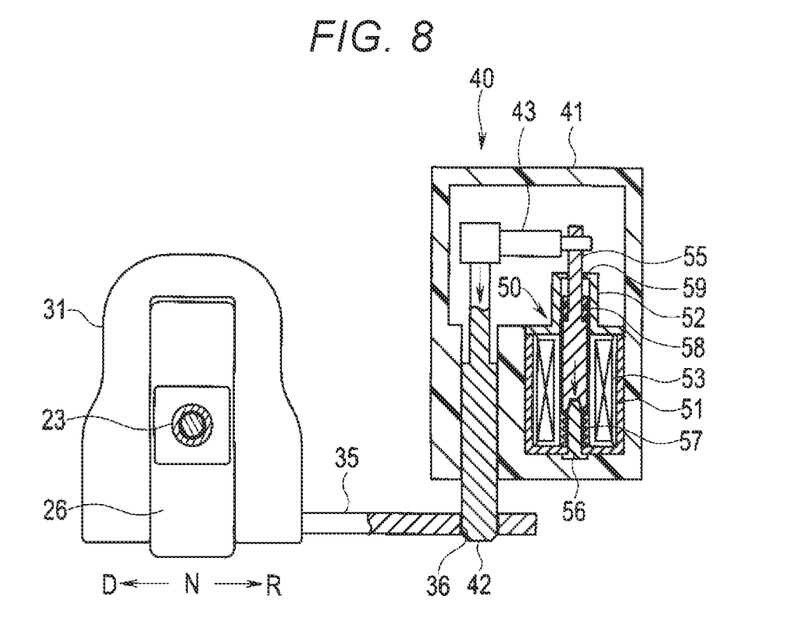
FIG. 8 is a sectional view illustrating a schematic configuration of a part of the selector lever unit in a state in which the fixing rod is protruded, which is taken along an VIII-VIII line in FIG. 7.

The shift lock mechanism 20 locks the selector lever 22 at the N range position while the vehicle 1 is stopped (at a vehicle speed of 0). In this state, in the shift lock mechanism 20, the fixing rod 42 being a shift lock member of the lock unit 40 is inserted into and engaged with the lock hole 36 corresponding to the N range of the lock arm 35, as illustrated in FIGS. 7 and 8.

In more detail, in the shift lock mechanism 20, the excitation coil 53 of the solenoid 50 is energized (made into an ON state) by the control unit 11 while the vehicle 1 is stopped (at a vehicle speed of 0). This causes the plunger 55 of the solenoid 50 to be pulled to the inside of the frame 51.

In response to this, the fixing rod 42 advances along with the movement of the plunger 55 and is inserted into and engaged with the lock hole 36 of the lock arm 35. In this manner, in the vehicle 1, the selector lever 22 is locked at the N range position. Thus, the selector lever 22 is in a state of being unable to move from the N range position to the D range position or the R range position.

The control unit 11 determines that the vehicle 1 is stopped (at a vehicle speed of 0) while a vehicle speed signal from the vehicle speed sensor 12 is not input, that is, zero. The control unit 11 performs control to energize (turn ON) the solenoid 50 in the state in which the vehicle speed signal is zero.

Upon receiving an ON signal from the brake switch due to stepping on the brake pedal 3 while the vehicle 1 is stopped (at a vehicle speed of 0), the control unit 11 controls to de-energize (shut OFF the power to) the excitation coil 53 of the solenoid 50. That is, the control unit 11 de-energizes the excitation coil 53 of the solenoid 50 upon receiving an ON signal from the brake switch, in the state of not receiving the vehicle speed signal from the vehicle speed sensor 12.

This makes the plunger 55 of the solenoid 50 be pushed (pressed) by the elastic force (urging force) of the coil spring 57.

Figure 9:
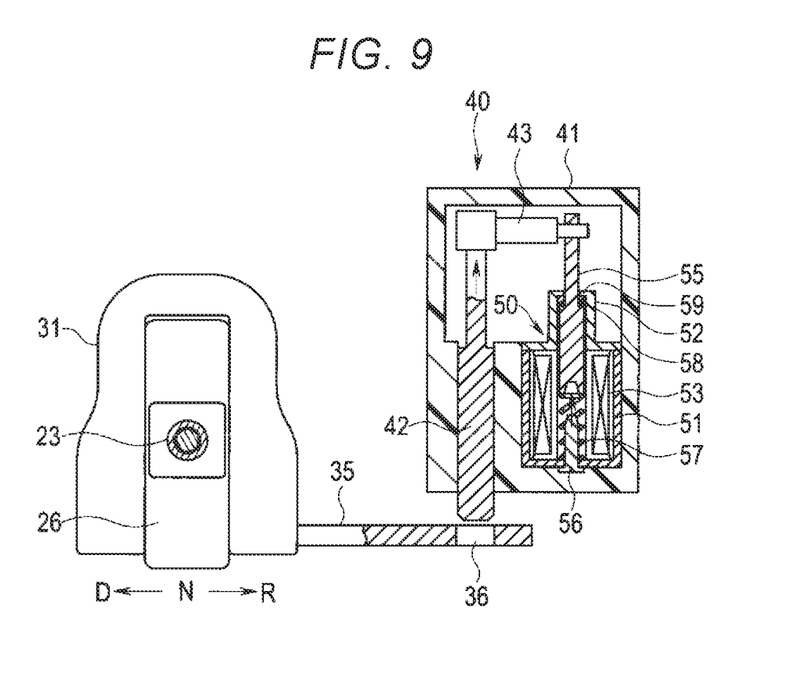
FIG. 9 is a sectional view illustrating the schematic configuration of the part of the selector lever unit in the neutral range, in a state in which the fixing rod is retracted.

At this time, in the shift lock mechanism 20 of the vehicle 1, the fixing rod 42 of the lock unit 40 retracts into the lock unit 40 along with the movement of the plunger 55, as illustrated in FIG. 9. As a result, the fixing rod 42 is in a retracted state in which it comes out and is disengaged from the lock hole 36 of the lock arm 35.

Thus, the selector lever 22 can be moved from the N range position to the D range position. The selector lever 22 can be moved from the N range position to the R range position, or moreover, to the P range position by pushing the push button 25 of the shift knob 24.

The solenoid 50, which has the sound-absorbing rubber 58 at the plunger 55, is reduced in impact sound at the time the plunger 55 moves. In more detail, the sound-absorbing rubber 58 comes into contact with the inward flange 59 of the cover frame 52 and thereby reduces impact sound at the time the plunger 55 moves.

On the other hand, in the shift lock mechanism 20, while the selector lever 22 is at the D range position, the R range position, or the P range position, the fixing rod 42 being a shift lock member of the lock unit 40 is in a retracted state in which it comes out of the lock hole 36 of the lock arm 35.

In this state, in the shift lock mechanism 20, the control unit 11 de-energizes (shuts OFF the power to) the excitation coil 53 of the solenoid 50. This makes the plunger 55 be pushed (pressed) by the elastic force (urging force) of the coil spring 57.

That is, the fixing rod 42 is in a state of being retracted from the lock arm 35 along with the plunger 55. Thus, the selector lever 22 can be moved from the D range position to the N range position, and moreover, it can be moved to the R range position or the P range position by pushing the push button 25 of the shift knob 24.

In the shift lock mechanism 20 of this embodiment, while the selector lever 22 is at the D range position, and the vehicle 1 travels at a predetermined low speed (e.g., at a vehicle speed of 15 km/h or lower) or is stopped (at a vehicle speed of 0), the control unit 11 energizes (turns ON the power to) the excitation coil 53 of the solenoid 50. The control unit 11 calculates a vehicle speed of the vehicle 1 based on an input value of the vehicle speed signal.

Figure 10:
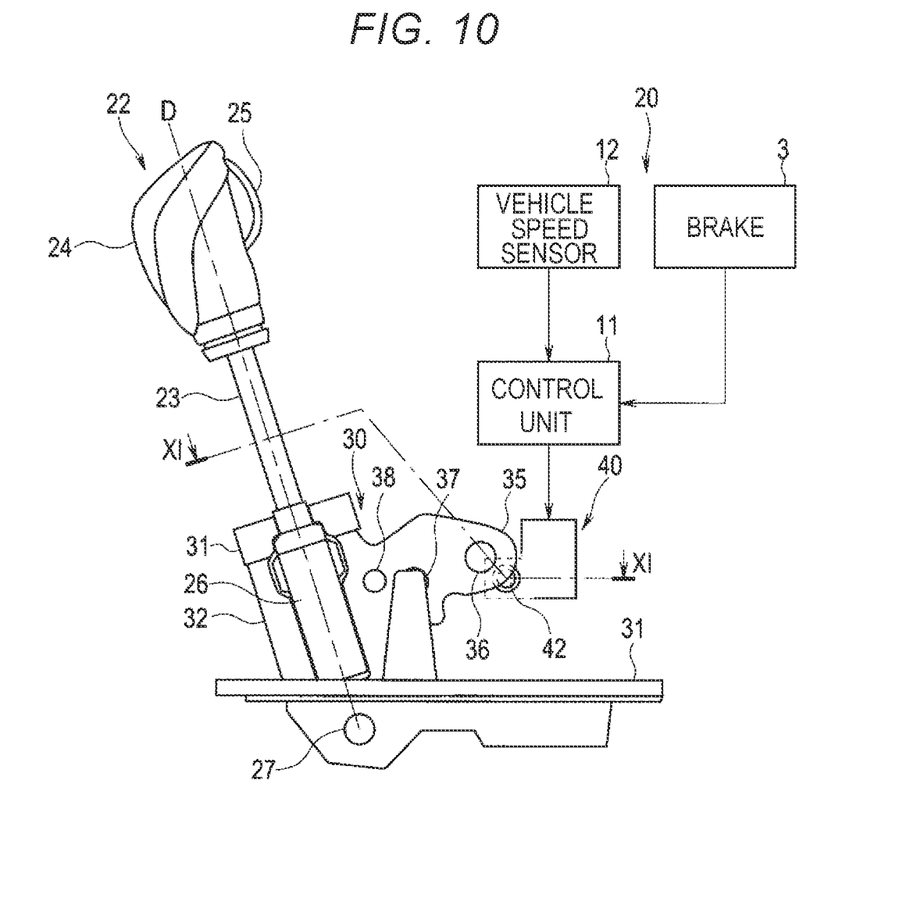
FIG. 10 is a side view illustrating the schematic configuration of the part of the selector lever unit in a drive range.
Figure 11:
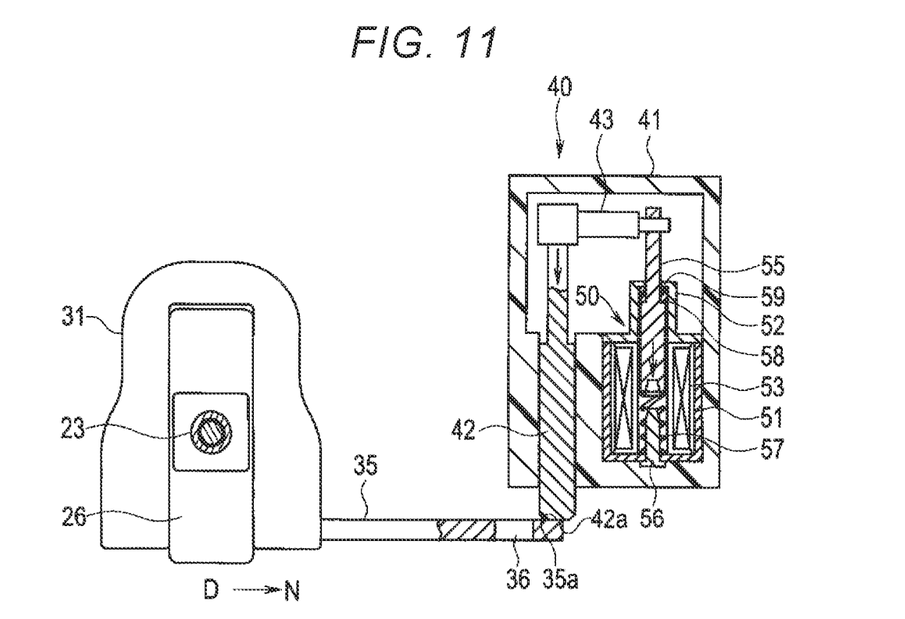
FIG. 11 is a sectional view illustrating the schematic configuration of the part of the selector lever unit in a state in which the fixing rod is in contact with a lock arm, which is taken along an XI-XI line in FIG. 10.

This causes the plunger 55 of the solenoid 50 to be pulled to the inside of the frame 51. Thus, in the shift lock mechanism 20, an end face 42a of the fixing rod 42, which moves along with the plunger 55, comes into contact with the flat surface 35a of the lock arm 35 in the vicinity of the lock hole 36, as illustrated in FIGS. 10 and 11.

Also, in the shift lock mechanism 20, while the selector lever 22 is at the R range position, and the vehicle 1 travels at a predetermined low speed (e.g., at a vehicle speed of 15 km/h or lower) or is stopped (at a vehicle speed of 0), the control unit 11 energizes (turns ON the power to) the excitation coil 53 of the solenoid 50.

Figure 12:
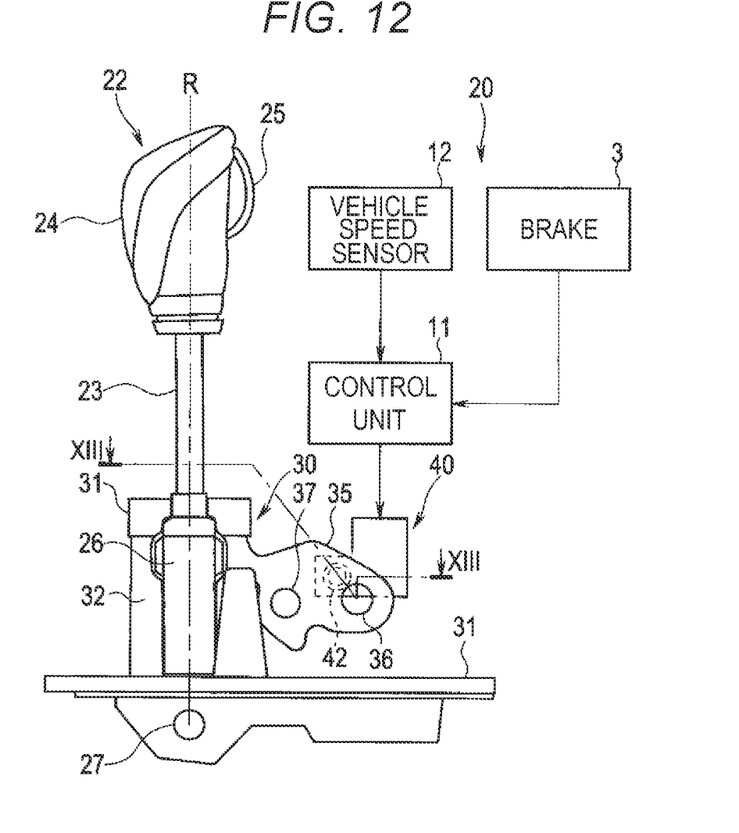
FIG. 12 is a side view illustrating the schematic configuration of the part of the selector lever unit in a reverse range.
Figure 13:
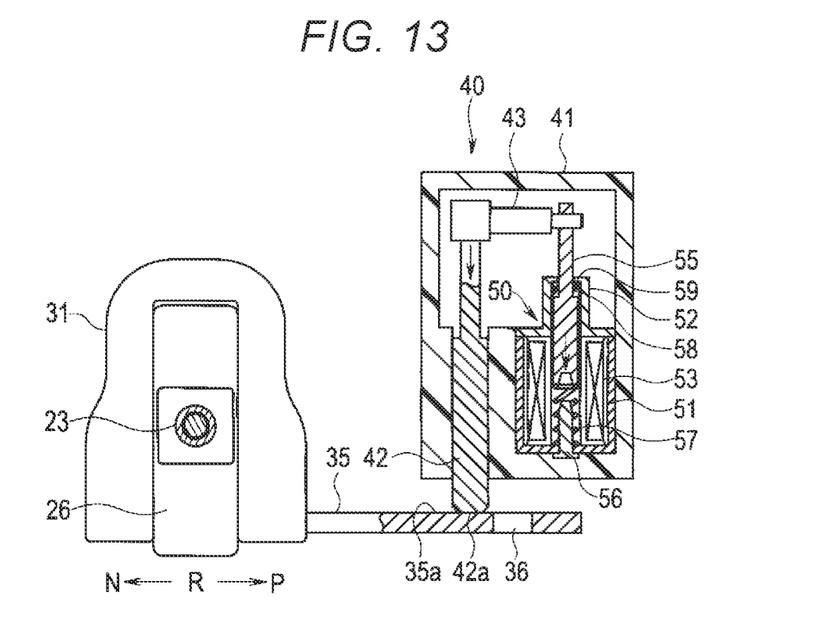
FIG. 13 is a sectional view illustrating the schematic configuration of the part of the selector lever unit in a state in which the fixing rod is in contact with the lock arm, which is taken along a XIII-XIII line in FIG. 12.

This causes the plunger 55 of the solenoid 50 to be pulled to the inside of the frame 51 in the shift lock mechanism 20. Thus, as illustrated in FIGS. 12 and 13, the end face 42a of the fixing rod 42, which moves along with the plunger 55, comes into contact with the flat surface 35a of the lock arm 35 in the vicinity of the lock hole 36.

In this manner, in the shift lock mechanism 20, the solenoid 50 is driven under control of the control unit 11 so that the end face 42a of the fixing rod 42 comes into contact with the flat surface 35a of the lock arm 35 in the vicinity of the lock hole 36, while the vehicle 1 travels at a predetermined low speed (e.g., at a vehicle speed of 15 km/h or lower) or is stopped (at a vehicle speed of 0).

In these states in which the end face 42a of the fixing rod 42 is in contact with the flat surface 35a of the lock arm 35, the sound-absorbing rubber 58, which is provided to the plunger 55, is compressed. The sound-absorbing rubber 58 in a compressed state applies the urging force to the plunger 55, against the elastic force of the coil spring 57.

The sound-absorbing rubber 58, which is provided to the plunger 55, reduces hitting sound that occurs when the end face 42a of the fixing rod 42, which moves along with the plunger 55, comes into contact with the flat surface 35a of the lock arm 35.

In this manner, in the shift lock mechanism 20, while the selector lever 22 is at the D range position or the R range position, and the vehicle 1 travels at a low speed or is stopped, the end face 42a of the fixing rod 42 is controlled to be in contact with the flat surface 35a of the lock arm 35.

In more detail, in the shift lock mechanism 20, while the selector lever 22 is at the D range position or the R range position in the condition in which the vehicle 1 travels at a low speed or is stopped and the brake pedal 3 is not stepped on, the control unit 11 controls to energize (turn ON the power to) the solenoid 50.

In this state, at the time the selector lever 22 is moved from the D range position or the R range position to the N range position, the fixing rod 42 is in a state of being ready to be inserted into the lock hole 36 of the lock arm 35. At this time, the sound-absorbing rubber 58 is compressed and urges the plunger 55 of the solenoid 50 in the pulling direction.

Thus, in response to the selector lever 22 being moved from the D range position or the R range position to the N range position due to stepping on the brake pedal 3, the fixing rod 42 is instantaneously inserted into and engaged with the lock hole 36 corresponding to the N range.

On the other hand, in the shift lock mechanism 20, while the vehicle 1 does not travel at a low speed and is not stopped but travels at a speed exceeding a predetermined speed (e.g., a vehicle speed of 15 km/h or lower), the control unit 11 de-energizes (turns OFF the power to) the solenoid 50.

Thus, while the vehicle 1 travels at a speed exceeding the predetermined speed, the selector lever 22 can be moved between the N range position and the D range position in the shift lock mechanism 20, as in an existing technique.

Figure 14:
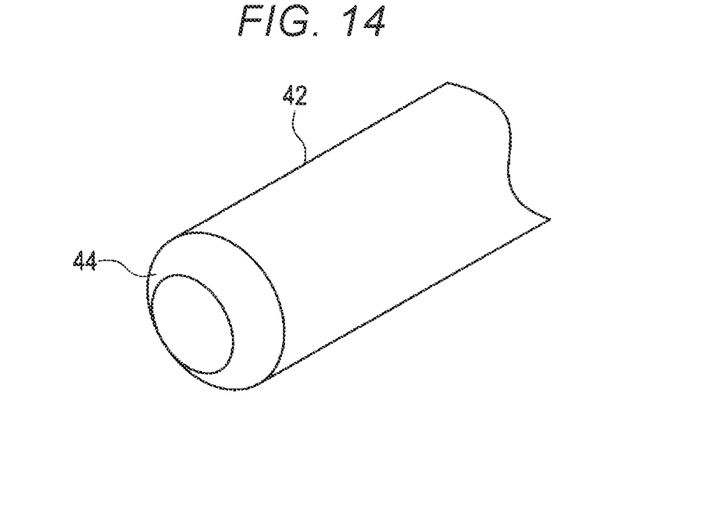
FIG. 14 is a perspective view illustrating a shape of an end face of the fixing rod.

The end, that faces the lock arm 35, of the fixing rod 42 is formed with a tapered surface 44 being a slope part, as illustrated in FIG. 14.

Figure 15:
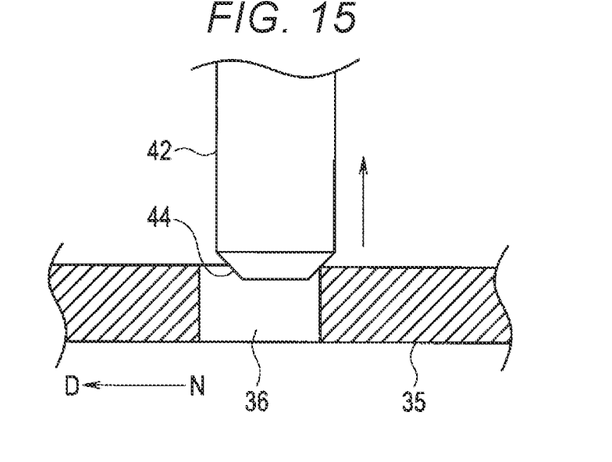
FIG. 15 is a partial sectional view illustrating a state in which the fixing rod is coming out from a lock hole of the lock arm when a shift is changed from the neutral range to the drive range.

In this manner, the tapered surface 44 is provided at the end of the fixing rod 42 in the shift lock mechanism 20. With this structure, when the fixing rod 42 is retracted from the lock hole 36 of the lock arm 35 in changing the shift from the N range to the D range, the tapered surface 44 comes into contact with an edge of the lock hole 36, thereby preventing the fixing rod 42 from being caught, as illustrated in FIG. 15.

Figure 16:
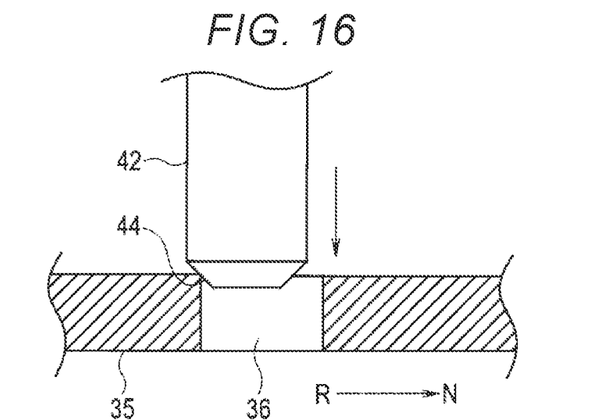
FIG. 16 is a partial sectional view illustrating a state in which the fixing rod is being inserted into the lock hole of the lock arm when the shift is changed from the reverse range to the neutral range.

Also, in the shift lock mechanism 20, when the fixing rod 42 is inserted into the lock hole 36 of the lock arm 35 in changing the shift from the R range to the N range, the tapered surface 44 comes into contact with the edge of the lock hole 36, thereby preventing the fixing rod 42 from being caught, as illustrated in FIG. 16.

Figure 17:
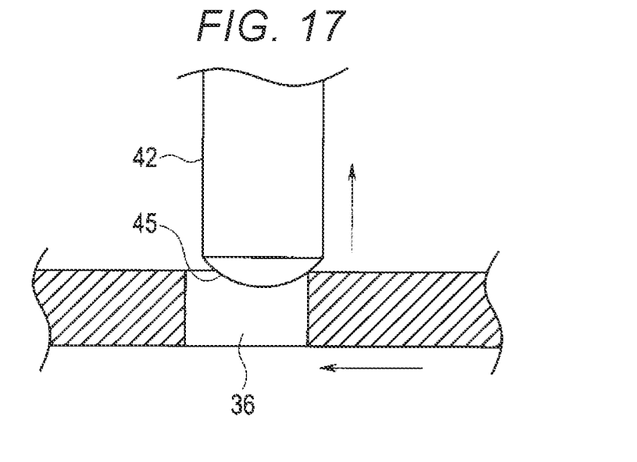
FIG. 17 is a partial sectional view illustrating a state in which the fixing rod is coming out of the lock hole of the lock arm when the shift is changed from the neutral range to the drive range, in a modified example.
Figure 18:
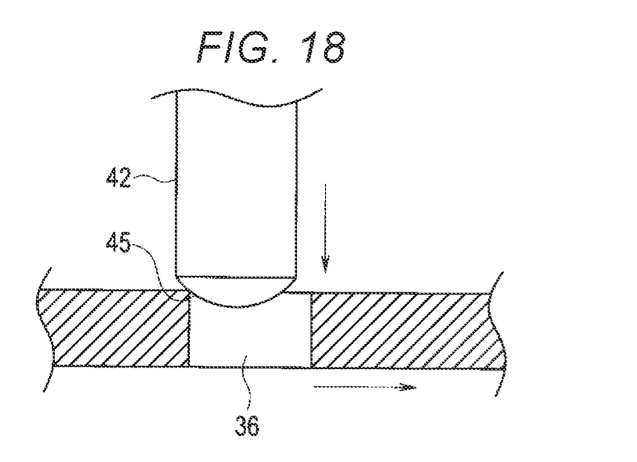
FIG. 18 is a partial sectional view illustrating a state in which the fixing rod is being inserted into the lock hole of the lock arm when the shift is changed from the reverse range to the neutral range, in the modified example.

Instead of the tapered surface 44, the end of the fixing rod 42 may have a spherical surface 45 as a slope surface, as illustrated in FIGS. 17 and 18. In the shift lock mechanism 20 thus having the spherical surface 45 at the end of the fixing rod 42, when the shift is changed from the N range to the D range or the R range, the spherical surface 45 comes into contact with the edge of the lock hole 36, thereby preventing the fixing rod 42 from being caught.

The shift lock mechanism 20 does not operate until the brake pedal 3 is stepped on, in shifting the gears from the N range position for a non-traveling state to the D range position or the R range position for a traveling state when the vehicle 1 is stopped. In other words, the shift lock mechanism 20 of the vehicle 1 has an interlock mechanism that does not operate until the brake pedal 3 is stepped on, in switching advance and reverse movements of the vehicle 1 by shifting the gears from the N range position for a non-traveling state to the D range position or the R range position for a traveling state.

As described above, the shift lock mechanism 20 of the vehicle 1 has the tapered surface 44 or the spherical surface 45 at the end of the fixing rod 42. This structure prevents catching of the fixing rod 42 of the lock member, which is inserted into or comes out of the lock hole 36 of the lock arm 35.

Thus, the shift lock mechanism 20 of the vehicle 1 absorbs structural variations of the lock hole 36 of the lock arm 35, the fixing rod 42, and so on.

In addition, the shift lock mechanism 20 of the vehicle 1 is provided with the sound-absorbing rubber 58 at the plunger 55 of the solenoid 50 being a drive source, for the purpose of reducing movement sound of the lock unit 40 being a driving device.

This structure reduces impact sound at the time the plunger 55 moves as well as hitting sound occurring when the end face 42a of the fixing rod 42 comes into contact with the flat surface 35a of the lock arm 35.

Moreover, in the shift lock mechanism 20 of the vehicle 1, when the vehicle 1 travels at a low speed or is stopped in the state in which the selector lever 22 is at the D range position or the R range position, the end face 42a of the fixing rod 42 is controlled to be in contact with the flat surface 35a of the lock arm 35.

Under these conditions, the sound-absorbing rubber 58 is compressed and applies the urging force to the plunger 55 of the solenoid 50, in the direction in which the fixing rod 42 is inserted into the lock hole 36 of the lock arm 35.

Thus, in shifting the selector lever 22 to the N range position, the fixing rod 42 is instantaneously inserted into and engaged with the lock hole 36 of the lock arm 35 without having a free moving distance.

In this manner, the shift lock mechanism 20 of the vehicle 1 of this embodiment enables achieving both prevention of the lock member from being caught during moving and absorption of structural variations, as well as both improvement in movement speed of the lock member and absorption of structural variations.

The control unit 11 has a processor including a central processing unit (CPU) and a storage, such as a ROM and a RAM. In addition, all, or one or more of circuits of the processor may be executed by software. For example, each program corresponding to each function stored in the ROM may be read and executed by the CPU.

Moreover, all, or one or more of the functions of the processor may be implemented by logic circuits or analog circuits, and each program may be processed by an electronic circuit, such as an FPGA.

The disclosure described in relation to the foregoing embodiment is not limited thereto, and moreover, various modifications can be made within a range not departing from the gist of the disclosure in a practice stage. Furthermore, the above-described embodiment includes techniques in various levels of stages, and each type of technique can be derived by appropriately combining the elements disclosed herein.

For example, in a case in which the above-described problems are solved and the above-described effects are obtained even if some elements are removed from all elements described in relation to the embodiment, the structure or the configuration from which the some elements are removed can be derived as a technique of the disclosure.

The invention claimed is:

1. A shift lock mechanism for a vehicle, the shift lock mechanism comprising:
   a selector lever selecting a transmission gear of an automatic transmission of the vehicle;
   a member to be locked that is provided to the selector lever;
   an engaging part provided to the member to be locked at a position corresponding to the transmission gear selected by using the selector lever;
   a lock member disposed so as to face the member to be locked and engageable with the engaging part;
   a slope part disposed at an end of the lock member and configured to prevent the lock member from being caught when the lock member is being engaged or disengaged;
   a driving device configured to drive the lock member so that the lock member is engaged with the engaging part to lock the selector lever and configured to drive the lock member so that the lock member is disengaged and retracted from the engaging part to enable the selector lever to move;
   a buffer member provided to the driving device and configured to be compressed to urge the lock member toward the member to be locked while the lock member is retracted; and
   a control device configured to receive a depression signal from a brake pedal of the vehicle and a vehicle speed signal from a vehicle speed sensor of the vehicle and comprising a processor and a memory storing instructions for causing the processor to
      control the driving device by energizing or de-energizing the driving device,
   wherein the selector lever is configured to swing around a rotation axis,
   wherein the member to be locked includes a flat surface orthogonal to the rotation axis and swings with the selector lever around the rotation axis,
   wherein the engaging part includes a lock hole opening in the flat surface,
   wherein the driving device is configured to move the lock member along an axis parallel to the rotation axis,
   wherein the end of the lock member:
      a) faces an opening of the lock hole i) when the lock member is retracted and ii) when the transmission gear selected by using the selector lever is a neutral range, and
      b) faces a portion of the flat surface excluding the opening of the lock hole i) when the lock member is retracted, and ii) when the transmission gear selected by using the selector lever is a reverse range or a drive range,
   wherein the processor is configured to:

energize the driving device to contact the end of the lock member with the portion of the flat surface excluding the opening of the lock hole:
   i) when the transmission gear selected by using the selector lever is the reverse range or the drive range, and
   ii) when a vehicle speed calculated based on the received vehicle speed signal is equal to or less than a predetermined value; and
de-energize the driving device to retract the lock member:
   i) when the transmission gear selected by using the selector lever is the reverse range or the drive range, and
   ii) when the vehicle speed is greater than the predetermined value, and
wherein the buffer member is configured to be compressed when the end of the lock member is in contact with the portion of the flat surface excluding the opening of the lock hole.

2. The shift lock mechanism of the vehicle according to claim 1,
wherein the processor is configured to:
energize the driving device to engage the lock member with the engaging part:
   i) when the transmission gear selected by using the selector lever is the neutral range,
   ii) when the vehicle speed is zero, and
   iii) when the depression signal from the brake pedal of the vehicle is not received; and
de-energize the driving device to disengage and retract the lock member from the engaging part:
   i) when the transmission gear selected by using the selector lever is the neutral range,
   ii) when the vehicle speed is zero, and
   iii) when the depression signal from the brake pedal of the vehicle is received.

3. A shift lock mechanism for a vehicle, the shift lock mechanism comprising:
a selector lever for selecting a transmission gear of an automatic transmission of the vehicle;
a member to be locked that is provided to the selector lever;
an engaging part provided to the member to be locked at a position corresponding to the transmission gear selected by using the selector lever;
a lock member disposed so as to face the member to be locked and engageable with the engaging part;
a slope part disposed at an end of the lock member and configured to prevent the lock member from being caught when the lock member is being engaged or disengaged;
a driving device including a solenoid and configured to drive the lock member so that the lock member is engaged with the engaging part to lock the selector lever and configured to drive the lock member so that the lock member is disengaged and retracted from the engaging part to enable the selector lever to move;
a buffer member provided to the driving device and configured to be compressed to urge the lock member toward the member to be locked while the lock member is retracted; and circuitry configured to
receive a depression signal from a brake pedal of the vehicle and a vehicle speed signal from a vehicle speed sensor of the vehicle and
control the solenoid of the driving device by energizing or deenergizing the solenoid,
wherein the selector lever is configured to swing around a first axis,
wherein the member to be locked includes a flat surface orthogonal to the first axis and swings with the selector lever around the first axis,
wherein the engaging part includes a lock hole opening in the flat surface,
wherein the end of the lock member:
   a) faces an opening of the lock hole i) when the lock member is retracted, and ii) when the transmission gear selected by using the selector lever is a neutral range, and
   b) faces a portion of the flat surface excluding the opening of the lock hole i) when the lock member is retracted, and ii) when the transmission gear selected by using the selector lever is a reverse range or a drive range,
wherein the circuitry is configured to:
energize the driving device to contact the end of the lock member with the portion of the flat surface excluding the opening of the lock hole,
   i) when the transmission gear selected by using the selector lever is the reverse range or the drive range, and
   ii) when a vehicle speed calculated based on the received vehicle speed signal is equal to or less than a predetermined value; and
de-energize the driving device to retract the lock member:
   i) when the transmission gear selected by using the selector lever is the reverse range or the drive range, and
   ii) when the vehicle speed is greater than the predetermined value, and
wherein the buffer member is configured to be compressed when the end of the lock member is in contact with the portion of the flat surface excluding the opening of the lock hole.

4. The shift lock mechanism of the vehicle according to claim 3,
wherein the circuitry is configured to:
energize the driving device to engage the lock member with the engaging part:
   i) when the transmission gear selected by using the selector lever is the neutral range,
   ii) when the vehicle speed is zero, and
   iii) when the depression signal from the brake pedal of the vehicle is not received; and
de-energize the driving device to disengage and retract the lock member from the engaging part:
   i) when the transmission gear selected by using the selector lever is the neutral range,
   ii) when the vehicle speed is zero, and
   iii) when the depression signal from the brake pedal of the vehicle is received.

* * * * *